United States Patent [19]

Imai et al.

[11] 4,331,053
[45] May 25, 1982

[54] ROTARY DIE CUTTER

[75] Inventors: Hiroto Imai, Fukuyama; Noriyuki Hoshino, Mihara, both of Japan

[73] Assignee: Mitsubishi Jukogyo Kabushiki Kaisha, Tokyo, Japan

[21] Appl. No.: 173,678

[22] Filed: Jul. 30, 1980

[30] Foreign Application Priority Data

Jul. 31, 1979 [JP] Japan .................................. 54-97469
Jun. 6, 1980 [JP] Japan .................................. 55-76132

[51] Int. Cl.³ .............................................. B31B 1/20
[52] U.S. Cl. ...................................... 83/174; 83/311; 83/347; 493/355
[58] Field of Search ................ 83/174, 347, 346, 311, 83/312; 493/354, 355, 353

[56] References Cited

U.S. PATENT DOCUMENTS

| | | | |
|---|---|---|---|
| 1,967,559 | 7/1934 | Schreck | 83/311 X |
| 2,070,537 | 2/1937 | Matthews | 83/311 X |
| 3,143,910 | 8/1964 | Greis | 83/311 |
| 3,832,926 | 9/1974 | Leaseburge et al. | 83/311 |
| 3,882,745 | 5/1975 | Garrett et al. | 83/311 |
| 3,899,945 | 8/1975 | Garrett et al. | 83/38 |
| 4,240,312 | 12/1980 | Ward, Sr. | 83/311 |
| 4,269,093 | 5/1981 | Nickum | 83/174 |

*Primary Examiner*—Frank T. Yost

[57] ABSTRACT

There is provided a rotary die cutter for effecting a punching and scribing on a sheet which is fed between a die cylinder and an anvil cylinder disposed in parallel with said die cylinder. The die cylinder is adapted to be rotated in a predetermined direction and provided on its peripheral surface with a knife and a scribing rule. The anvil cylinder is adapted to be rotated in the opposite direction to the die cylinder and provided on its peripheral surface with an anvil for receiving the knife and the scribing rule. There is a mechanism for adjusting the clearance between the die cylinder and the anvil cylinder. A blade carrier is disposed adjacent to the anvil cylinder and slidable in the axial direction of the anvil cylinder. A cutting blade capable of cutting the anvil surface is attached to the blade carrier in such a manner as to move toward and away from the axis of the anvil cylinder. A staged gear type speed changing device is interposed between the driving mechanisms for the die cylinder and the anvil cylinder for and is adapted to change the velocity of the anvil cylinder with respect to that of the die cylinder over a plurality of stages at a fine step.

4 Claims, 17 Drawing Figures

| OUTSIDE DIAMETER OF THE ANVIL (mm) | 409 | 407 | 405.5 | 404 | 402.5 |
|---|---|---|---|---|---|
| NUMBER OF TEETH OF THE CLUTCH GEAR | 101 | 101 | 101 | 101 | 101 |
| GEAR REFERENCE NUMERAL | 54 | 55 | 56 | 57 | 58 |
| GEAR NUMBER OF TEETH | 121 | 124 | 127 | 130 | 133 |

FIG. 17

ROTARY DIE CUTTER

BACKGROUND OF THE INVENTION

1. Field of the Invention

The invention relates to a rotary die cutter adapted to effect a punching and scribing on a sheet which is fed between a die cylinder and an anvil cylinder, the die cylinder being adapted to be rotated in a predetermined direction and provided on its peripheral surface with a knife and a scribing rule, while the anvil cylinder disposed in parallel with the die cylinder being provided on its peripheral surface with an anvil for receiving the knife and the scribing rule and being adapted to be rotated in the opposite direction to the die cylinder, and more particularly to a construction for compensating for secular change of quality of the anvil surface due to the punching by the knife.

2. Description of the Prior Art

Figure 1:
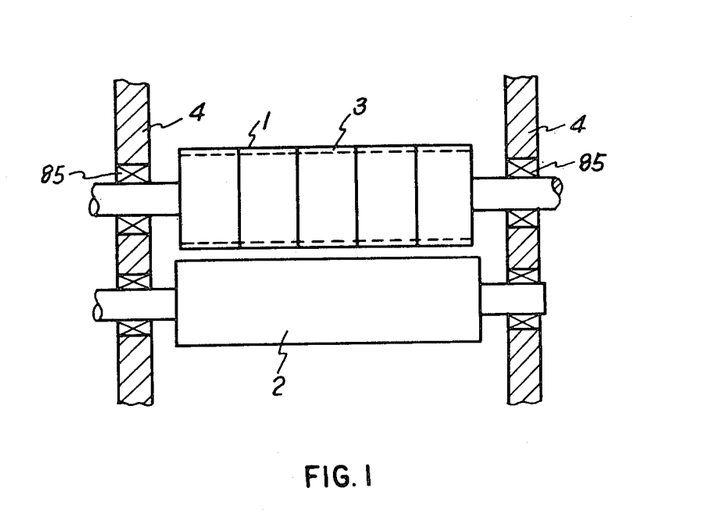
FIG. 1 is an elevation of the structure of a conventional rotary die cutter thereof with a part shown in cross section.
Figure 2:
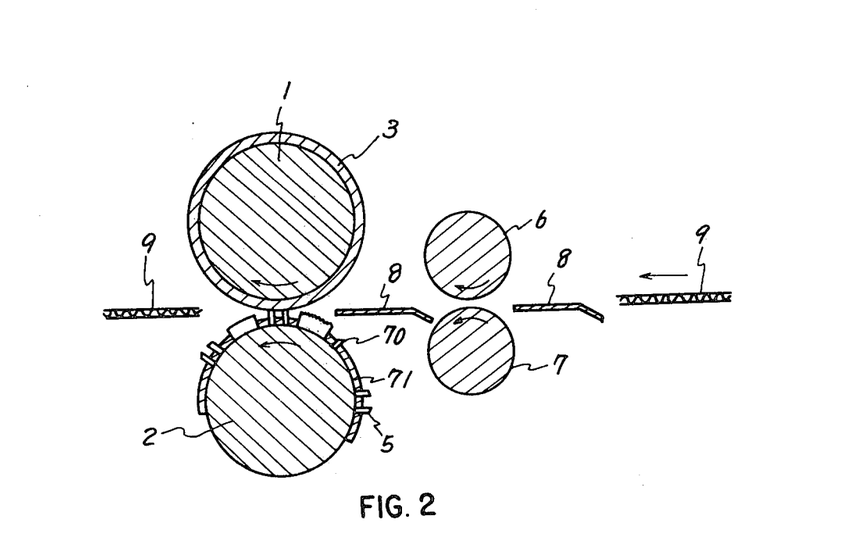
FIG. 2 is a vertical cross sectional view of a conventional rotary die cutter.

FIGS. 1 and 2 show schematically the construction of a conventional rotary die cutter. Referring to FIG. 2, a sheet 9 transferred from a preceding step of process is forwarded in the direction of arrow over a sheet guide 8 and fed into the gap between an anvil cylinder 1 and a die cylinder 2 by means of a pair of feed rolls 6, 7. The anvil cylinder 1 is provided with an urethane rubber anvil 3 wound therearound, while a die 71 attached to the outer periphery of the die cylinder has a knife 5 for punching the sheet and a scribing rule 70.

The anvil cylinder 1 and the die cylinder 2 are adapted to be rotated in the opposite directions as indicated by arrows. The clearance between these cylinders is adjusted such that the edge of the knife 5 cuts into the anvil 3 to a suitable depth. The radial height of the scribing rule 70 is slightly smaller than that of the knife 5 so that a slight gap is formed between the end of the scribing rule 70 and the anvil 3. The scribing rule 70 is adapted to form in the sheet 9 a recess or groove (referred to as "scribed line", hereinafter) which is used as the reference when the sheet 9 is folded. The sheet 9 is completely cut by the knife 5 as the latter cuts into the anvil 3 across the sheet 9, so that the anvil 3 is inevitably damaged by the knife 5. The damage in the surface of the anvil 3 gradually develops and grows as the operation is continued over a certain period, so that the anvil surface is undesirably roughened so that the cutting of the sheet 9 is locally deteriorated or hindered. In such a case, the distance between the axes of the cylinders is adjusted to obtain a sufficiently large cutting of the knife 5 into the anvil 3. As this process is repeated, the outside diameter of the anvil 3 is gradually reduced due to the cutting by the knife and the roughness of the anvil surface is further increased. In consequence, the punching of the sheet 9 by the knife 5 is made incomplete. In addition, since the gap between the anvil surface and the scribing rule 70 is made non-uniform, the depth of the scribed line is rendered also non-uniform. In the worst case, the sheet is completely penetrated by the scribing rule 70 at some portions of the scribed line. This in turn poses a problem that the sheet cannot be folded precisely when it is folded into the shape of the box.

In addition, the feed speed of the sheet 9 is gradually lowered partly because of the reduced peripheral speed of the anvil 3 due to decreased diameter and partly because of a reduced friction between the sheet 9 and the anvil surface due to the roughening of the anvil surface. When the anvil 3 has been worn out to have extremely large roughness on the anvil surface, the anvil is renewed with a new anvil.

SUMMARY OF THE INVENTION

Under these circumstances, the present invention aims at providing, as a first object thereof, a rotary die cutter having a cutting blade capable of cutting the anvil surface, the cutting blade being used after a predetermined number of working hours of the rotary die cutter to cut and smooth the anvil surface to the original surface state to recover a complete cutting and uniform scribing, thereby to overcome the above-described problems of the prior art.

Another object of the invention is to provide a rotary die cutter having a staged gear type speed changing mechanism which changes the rotation speed of the anvil cylinder over a plurality of stages at a fine pitch to compensate for the reduction of the anvil diameter due to the cutting by the cutting blade, thereby to ensure a higher precision of cutting of the sheet.

To these ends, according to an aspect of the invention, there is provided, rotary die cutter for effecting a punching and scribing on a sheet which is fed between a die cylinder and an anvil cylinder disposed in parallel with the die cylinder, the die cylinder being adapted to be rotated in a predetermined direction and provided on its peripheral surface with a knife and a scribing rule, while the anvil cylinder being adapted to be rotated in the opposite direction to the die cylinder and provided on its peripheral surface with an anvil for receiving the knife and the scribing rule, characterized by comprising a mechanism for adjusting the clearance between the die cylinder and the anvil cylinder, a blade carrier disposed adjacent to the anvil cylinder and slidable in the axial direction of the anvil cylinder and a cutting blade capable of cutting the anvil surface and attached to the blade carrier in such a manner as to move toward and away from the axis of the anvil cylinder.

In use of the rotary die cutter of the invention having the described construction, the feed of the sheet is stopped as the anvil surface is roughened after a predetermined operation for punching and scribing of the sheet. Then, the cutting blade is brought to a position for cutting into the anvil to a predetermined depth and the cutting blade carrier is moved in the axial direction of the anvil cylinder to cut and smooth the anvil surface to such an extent as to have no substantial roughness or a degree of roughness such that it does not materially affect the processing on the sheet. Subsequently, after adjusting the clearance between the anvil cylinder and the die cylinder to provide a suitable penetration of the knife into the anvil, the cutting and scribing operation is started again.

Thus, according to the invention, it is possible to maintain a good surface condition of the anvil by cutting the anvil surface periodically without demounting the anvil cylinder from the rotary die cutter, so as to ensure a perfect cutting of the sheet and a uniform scribing in the sheet. Since the cutting of the anvil surface is conducted without demounting the anvil cylinder, the suspension period of the punching and scribing work is diminished to improve the productivity of the processed sheet.

According to a second aspect of the invention, there is provided a rotary die cutter which comprises, in addition to the features of the first aspect, a staged gear type speed changing device interposed between the driving mechanisms for the die cylinder and the anvil cylinder and adapted to change the angular velocity of the anvil cylinder with respect to that of the die cylinder over a plurality of stages at a fine step.

According to this aspect of the invention, the angular velocity of the anvil cylinder is changed by the staged gear type speed changing mechanism to compensate for the reduction of the peripheral speed of the anvil cylinder due to the decrease of the diameter caused by the cutting, to maintain a constant ratio of the peripheral speed of the anvil cylinder to that of the die cylinder for constant quality of cutting and scribing.

Thus, according to the invention, the ratio of peripheral speeds between the anvil cylinder and the die cylinder is maintained unchanged before and after the cutting of the anvil surface so that the fluctuation of cutting size is avoided to ensure a high precision of the cutting.

DESCRIPTION OF THE PREFERRED EMBODIMENT

Figure 3:
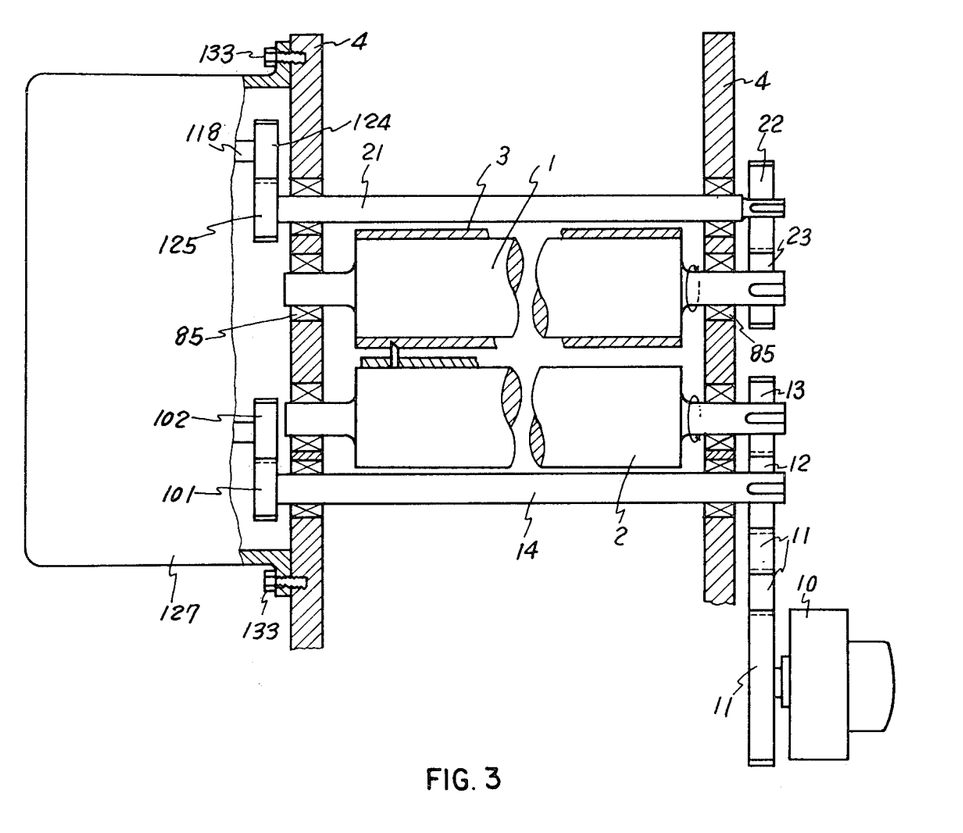
FIG. 3 is an elevation thereof with a part shown in cross section showing the entire construction of a rotary die cutter in accordance with a first preferred embodiment of the present invention.
Figure 6:
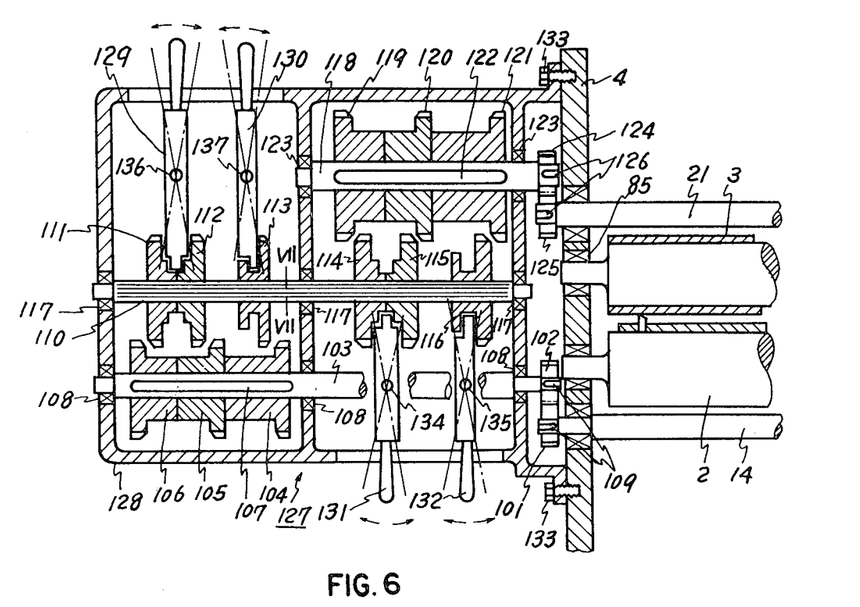
FIG. 6 is a transverse sectional view showing the speed change mechanism for the anvil cylinder.
Figure 7:
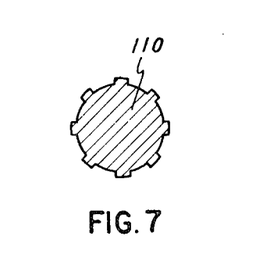
FIG. 7 is a cross sectional view taken along the line VII—VII in FIG. 6.

Referring to FIGS. 3–11, which illustrate one preferred embodiment of this invention. FIG. 3 illustrates the entire construction of a rotary die cutter of this embodiment. In the drawing, the reference numeral 10 denotes a variable-speed motor, the output of which is input into a gear 12 of the rotary die cutter through a gear train 11. The gear 12 meshes with a gear 13 fitted to the righthand end of a die cylinder 2. The gear 12 is mounted across the die cutter on a shaft 14 which is supported rotatably by frames 4, 4 and fitted with a gear 101 at the other end. FIG. 6 illustrates the structure of a speed change mechanism 127 in detail. The gear box 128 for housing the speed change mechanism 127 is secured fixedly to the frame 4 by means of bolts 133. A gear 102 is secured fixedly to the righthand end of a shaft 103 supported rotatably by a bearing 108 in the gear box 128 through a key 109 so as to mesh with the above stated gear 101. On the lefthand half portion of the shaft 103 are mounted gears 104, 105 and 106 by means of a key 107. Above the shaft 103, there is supported a spline shaft 110 having a cross section as shown in FIG. 7 on the gear box 128 rotatably through bearings 117. Around the spline shaft 110 there are arranged, as shown in FIG. 6, movable gears 111, 112, 113, 114, 115 and 116. These movable gears 111 to 116 have bores broached in the shape corresponding to the cross section of the spline shaft 110 as shown in FIG. 7 and are mounted on the spline shaft 110 in such a manner that they can slide therealong in the axial direction. Above the spline shaft 110, there is supported a shaft 118 rotatably on the gear box 128 through bearings 123, and the shaft 118 is mounted with gears 119, 120 and 121 through a key 122 and with a gear 124 through a key 126 at the righthand end. A shaft 21 is supported rotatably on the frames 4, 4 and mounted with a gear 125 at the lefthand end and a gear 22 at the righthand end, the gear 125 meshing with the above stated gear 124. An anvil cylinder 1 is supported rotatably on the frames 4, 4 by eccentric bearings 85, 85 and is fitted with a gear 23 at the righthand end which meshes with the above stated gear 22. A die cylinder 2 is arranged below the anvil cylinder 1 parallel thereto and supported rotatably on the frames 4, 4. The die cylinder 2 has a gear 13 mounted at the righthand end which meshes with the above stated gear 12. The gear box 128 includes shift levers 129, 130 131 and 132 supported thereon in such a manner that they can swing at a predetermined angle around pivots 136, 137, 134 and 135 respectively. The tip end of the shift lever 129 is inserted into a recess defined by the movable gears 111 and 112. The tip end of the shift lever 130 is engaged with a groove provided in the outer peripheral surface of the movable gear 113. The tip end of the shift lever 131 is inserted into a recess defined by the movable gears 114 and 115. The tip end of the shift lever 132 is engaged with a groove provided in the outer peripheral surface of the movable gear 116.

Figure 4:
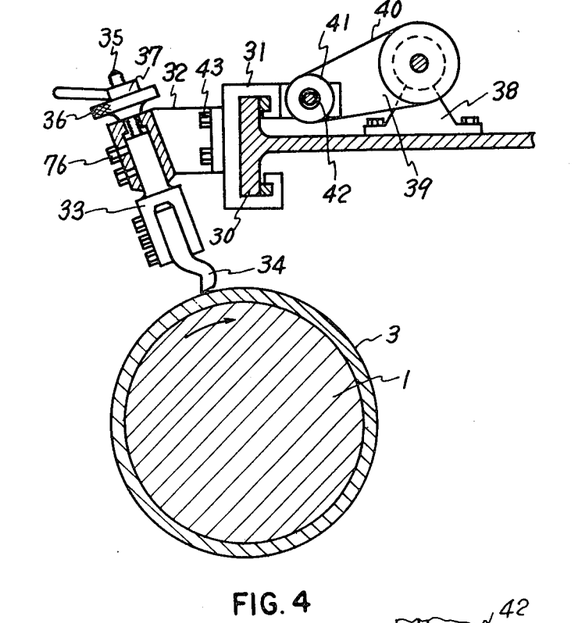
FIG. 4 is a side view showing the cutting mechanism in accordance with a first embodiment of the present invention.
Figure 5:
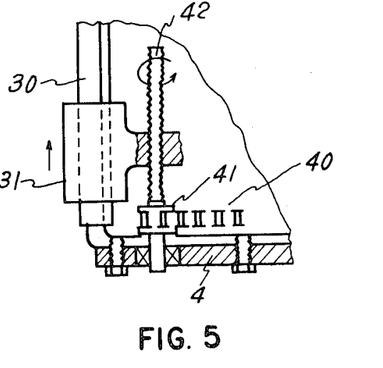
FIG. 5 is a top plan view showing a part of the cutting mechanism as shown in FIG. 4.

FIGS. 4 and 5 illustrate the cutting mechanism of the anvil arranged above the anvil cylinder 1, in which a guide rail 30 has a T-shaped cross section, as shown in FIG. 4, and is fixed on the frames 4, 4 at both ends. The flat portion of the T-shaped guide rail 30 is mounted with a motor 38 fixedly and the top portion thereof is engaged with a feed member 31, which is in turn fixed with a chuck holder 32 on the outer surface by means of bolts 43. The chuck holder 32 may be fixed by any other suitable fitting instead of bolts. The chuck holder 32 includes a gap positioned at the tip end and opened toward the anvil cylinder 1, into which a chuck 33 is inserted slidably forwards and backwards with respect to the anvil cylinder 1. The upper end of the chuck 33 is fixed with a screw rod 35 screwed into the chuck holder 32. The chuck 33 is fixed at a predetermined position on the chuck holder 32 by means of bolts 76.

The screw rod 35 has an adjusting nut 36 and a lock nut 37 mounted thereon so that the screw rod 35 is moved upwards and downwards so as to move the chuck 33 in the same direction by the rotation of the adjusting nut 36. The chuck 33 is secured with a cutting blade 34 at the tip end.

The feed member 31 has a projection on the opposite side to the chuck holder 32 and the projection includes an inner thread with which a screw rod 42 supported rotatably on the frames 4, 4 is engaged. The screw rod 42 is fitted with a sprocket wheel 41 at one end and a chain 40 interconnects between the sprocket wheel 41 and the sprocket 39 of the above mentioned motor 38. These constitute a mechanism for feeding the feed member 31 toward the axial direction of the anvil cylinder 1.

Since the anvil cylinder 1 is supported rotatably on the frame 4 through the eccentric bearings 85, the clearance between the anvil cylinder 1 and die cylinder 2 can be adjusted by the rotation of the bearings 85 with a suitable means.

The gap adjustment between the anvil cylinder 1 and die cylinder 2 can be carried out in other ways for example, by supporting one of the cylinders on the frame movably in the vertical direction.

The operation of the embodiment thus constructed will be explained in the following.

When the punching operation is applied to the sheet 9 between the anvil cylinder 1 and die cylinder 2 over a predetermined period of time, the surface of the anvil 3 becomes uneven due to the striking of the knife 5 of the die cylinder 2. This results in decrease in the punching accuracy and increase in the possibility of crack occurring. In this case, the surface of the anvil is moothed in the following way. At first the bolts 76 and lock nut 37 are slackened to rotate the adjusting nut 36 for adjusting the cutting depth of the blade 34 into the anvil 3. Then the lock nut 37 is fastened and the chuck 33 is fixed by bolts 76 so as to fix the blade 34. The motor 38 is driven under the condition in which the anvil cylinder 1 is rotated as in the sheet punching operation and the rotation of the motor is transmitted to the screw rod 42 through the sprocket wheel 39, chain 40 and sprocket wheel 41 to move the feed member 31 along the guide rail 30. The movement of the feed member 31 makes the blade 34 to move in the axial direction, and thereby cutting the surface of the rotating anvil 3. Then the blade 34 is projected slightly toward the anvil 3 and cutting is again applied to the surface of the anvil 3. By repeating this operation a proper number of times, the anvil surface is smoothed to such an extent that the unevenness thereon will give no disadvantage to the punching operation of the sheet 9. The gap between the outer surface of the anvil 3 and that of the die cylinder 2, widened due to the cutting and smoothing applied on the anvil surface, can be adjusted by the rotation of the eccentric bearings 85 to have a predetermined value.

Figure 8:
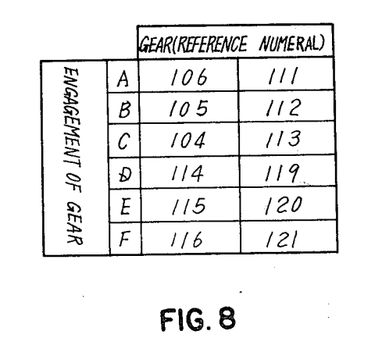
FIG. 8 is a table showing the engagement of gears.

Further, the outer diameter of the anvil 3 is reduced due to the cutting operation. Accordingly, if the anvil cylinder 1 is rotated at the same speed as before, the peripheral speed becomes necessarily smaller than before. Thus the relationship between the peripheral speed of the anvil and that of the die cylinder 2 is changed, which influences the moving speed of the sheet 9 though slightly. This will result in error occurring in the punching and cutting dimension. In this case, the speed change mechanism 127 as shown in FIG. 6 changes the rotation speed of the anvil cylinder 1 and hence the peripheral speed of the anvil 3. In FIG. 6, all the gears for effecting speed change are in the neutral position in which they are released from their mutual engagement. When the shift levers 129, 130, 131 and 132 are swung in proper ways, engagement can be obtained as shown in the table of FIG. 8 between the gears. For example, if the shift lever 129 is swung rightwards in FIG. 6, the tip end of the lever 129 is moved leftwards, which makes the movable gear 111 to slide leftwards along the spline shaft 110 to engage with the gear 106. This engagement is denoted by A in the table of FIG. 8. If the shift lever 131 is swung rightwards in FIG. 6, the tip end of the lever 131 is moved leftwards, which makes the movable gear 114 to slide leftwards along the spline shaft 110 to engage with the gear 119. This engagement is denoted by D in the table of FIG. 8. Thus in accordance with the swinging of the respective gear, engagements denoted by A to F can be obtained.

Figure 9:
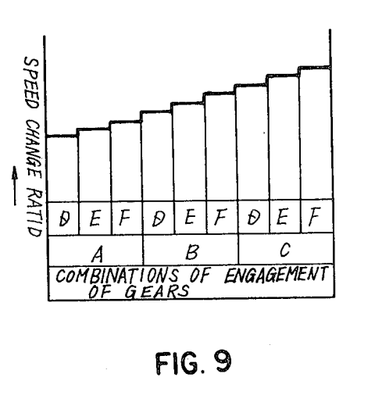
FIG. 9 is a graph showing the change of speed change ratios according to combinations of engagement of gears.
Figure 10:
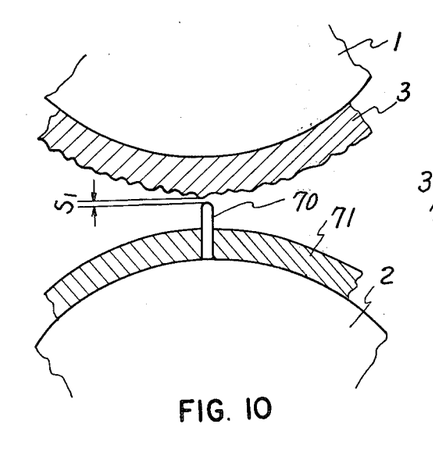
FIG. 10 is a longitudinal sectional view showing the relationship between the scribing rule and anvil.
Figure 11:
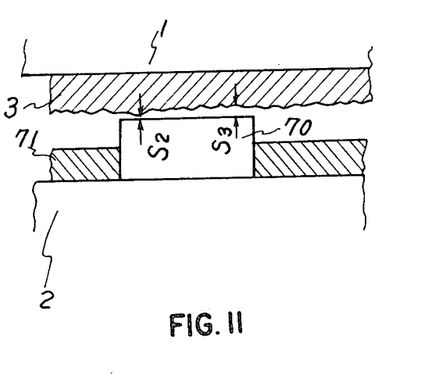
FIG. 11 is a transverse sectional view in the axial direction of the part shown in FIG. 10.

Assuming now that the engagements A and D are selected, the rotation of the shaft 14 driven by the variable drive motor 10 is transmitted to the shaft 103 through the engagement between the gears 101 and 102, and further transmitted to the spline shaft 110 through the gear 106 and movable gear 111. The rotation is further transmitted from the spline shaft 110 to the shaft 118 through the engagement between the movable 114 and gear 119 and finally to the anvil cylinder 1 through the gears 124 and 125, shaft 21, gears 22 and 23. During this time, the gears 104, 105, 120 and 121 and the movable gears 112, 113, 115 and 116 are rotating freely out of engagement. FIG. 9 is a graph showing the change of the speed change ratios to be obtained by various combinations of engagement of gears when shift levers are swung in a predetermined way. The change shown in the graph of FIG. 9 shows a gentle stepped slope, which means that in accordance with the respective combinations of engagement such a gentle stepped change of speed change ratios can be obtained. In order to obtain such speed change ratios as shown in FIG. 9, the gears 104, 105, 106, 119, 120 and 121 and the movable gears 111, 112, 113, 114, 115 and 116 are adapted to have a slightly different number of teeth respectively.

Though the peripheral speed ratio between the anvil cylinder 1 and die cylinder 2 is changed by the cutting of the anvil surface as mentioned above, this change can be compensated as follows: a new speed change ratio is obtained from the outer diameter of the anvil 3 having been subjected to cutting and an engagement combination of gears is selected in accordance therewith: then necessary shift levers are operated to carry out the selected engagement combination.

According to the present invention, the unevenness on the anvil surface accompanying punching operation can be cut and smoothed without dismounting the anvil from machine and further by use of the power which is primarily used for cutting operation. Thus the anvil surface can always be obtained substantially constant, and thereby preventing partial malfunctions in the punching or scribing of the sheet, which are likely to occur due to cracks, shortage of ruling pressure or the like on the anvil surface. Also much time can be saved in the anvil surface cutting, because a series of operations such as dismounting of the anvil, transportation, cutting, re-mounting, readjustment and the like can be omitted in the present invention. Accordingly the suspension time of the sheet punching operation can be extremely shortened, resulting in improvement in efficiency. Further the peripheral speed ratio between the anvil and die cylinders can be maintained substantially constant before and after the smoothing of the anvil surface only by the shift lever operation in a proper way. Thus irregularity of the cutting dimension of the sheet can be easily eliminated.

A second preferred embodiment of the invention will be described in detail with reference to FIGS. 12–17.

This embodiment is provided with an anvil cutting mechanism of a construction similar to that described in connection with the first preferred embodiment illustrated in FIGS. 4 and 5.

Figure 12:
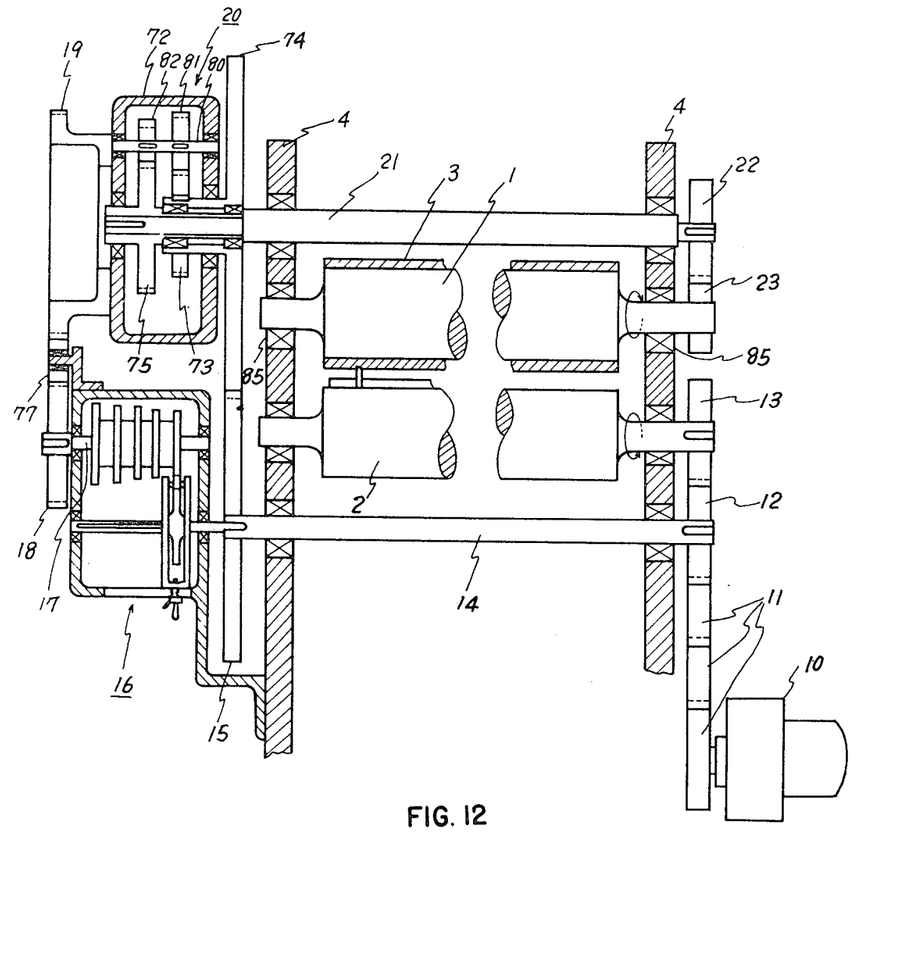
FIG. 12 is an elevation thereof with a part shown in cross section showing the entire construction of a rotary die cutter in accordance with a second preferred embodiment of the present invention.
Figure 13:
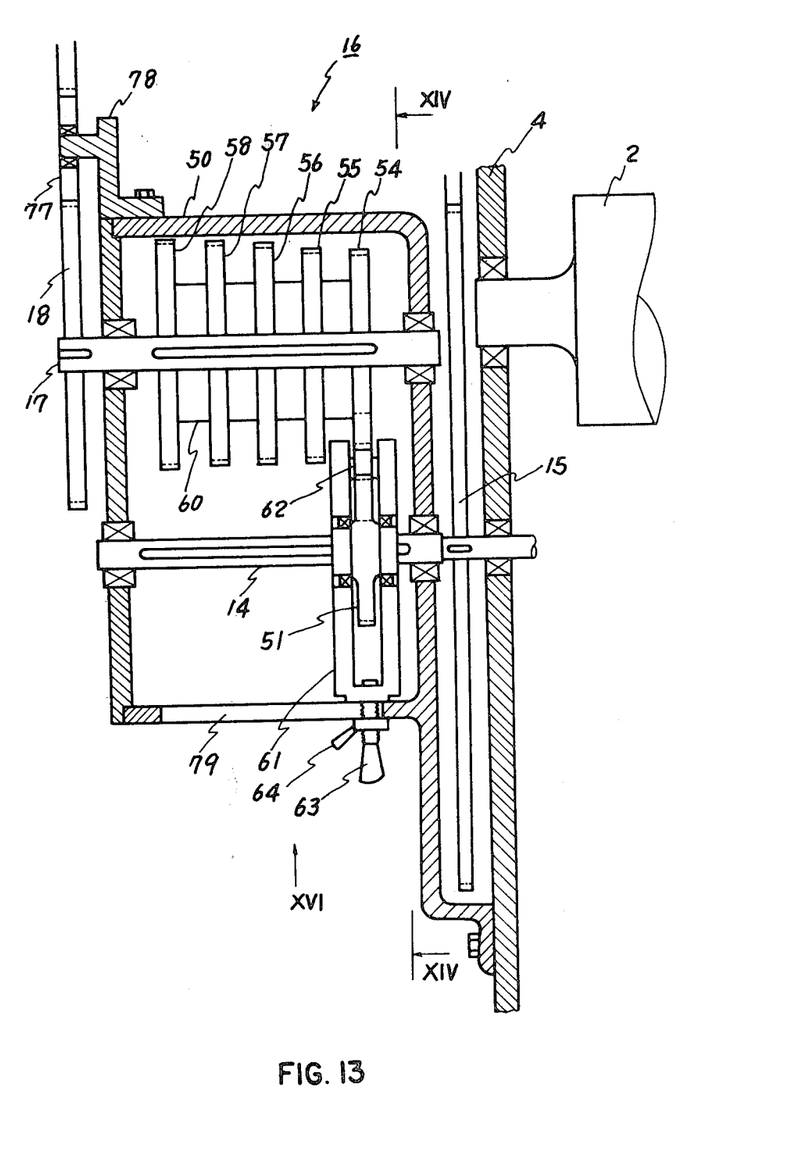
FIG. 13 is a transverse sectional view showing the speed change mechanism for the anvil cylinder.

Referring first to FIG. 12 showing the whole part, except for an anvil cutting mechanism, of a rotary die cutter constructed in accordance with this embodiment of the invention, a reference numeral 10 denotes a variable-speed motor which is the prime mover of the whole part of this embodiment. The output torque of this motor is transmitted to a gear 12 of the rotary die cutter through a gear train 11. The gear 12 is meshing with a gear 13 which is attached to the right-side end of the die cylinder 2.

The gear 12 is attached to a shaft which extends transversely of the rotary die cutter and rotatably supported at its both ends by frames 4, 4. A gear 15 is attached to the other end of this shaft the left-side end of which is further extended toward a gear type speed changing mechanism 16 fixed to the frame. The gear 15 engages with a gear 74 rotatably carried by a shaft 21 which in turn is rotatably carried by the frames 4, 4. A sun gear 73 of a differential speed reducer 20 is keyed to the boss of the gear 74. The gear type speed changing mechanism 16 is provided with an output shaft 17 to which attached is a gear 18 engaging through an intermediate gear 77 with a gear 19 which is attached to the case 72 of the differential speed reducer 20. Another sun gear 75 of the differential speed reducer 20 is keyed to the aforementioned shaft 21. The sun gears 73, 75 are meshing with gears 81, 82, respectively, which are attached to a shaft 80 rotatably supported by the case 72.

FIGS. 13–17 in combination show the detail of staged gear type speed changing device 16. A gear box 50 is fixed to the frame 4 and rotatably carries an extended portion of the shaft 14 to which attached is a clutch gear 51 for free axial sliding movement. A rocker link 61 is rockable around a point at which it is secured to the clutch gear 51 and carries at its one end rotatably an intermediate gear 62 which meshes with the clutch gear 51. The shaft 17 disposed above the shaft 14 is rotatably carried by the gear box 50. Gears 54, 55, 56, 57 and 58 having different number of teeth are attached to the shaft 17. A suitable gap is preserved between each adjacent gears by a spacer 60. These gears 54, 55, 56, 57 and 58 are adapted to mesh with the intermediate gear 62 independently of each other. A handle 63 is attached to the other end of the rocker link 62.

Figure 14:
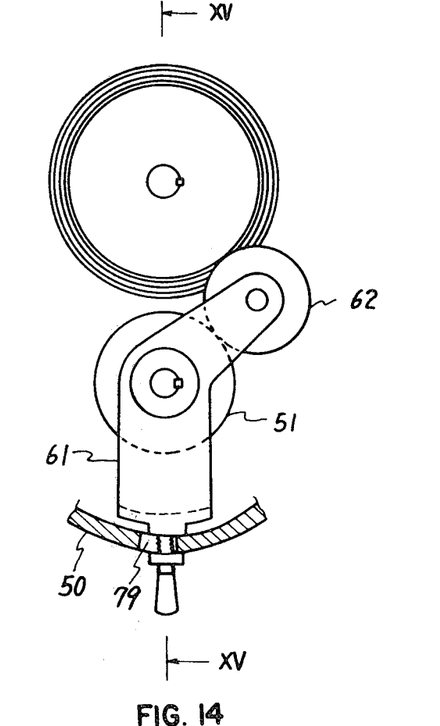
FIG. 14 is a sectional view taken along the line XIV—XIV in FIG. 13.
Figure 15:
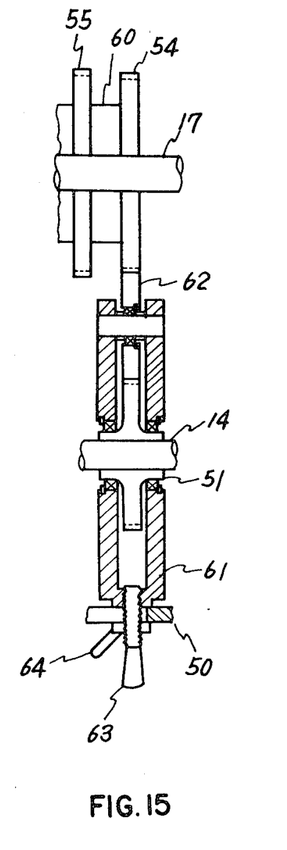
FIG. 15 is a sectional view taken along the line XV—XV in FIG. 14.
Figure 16:
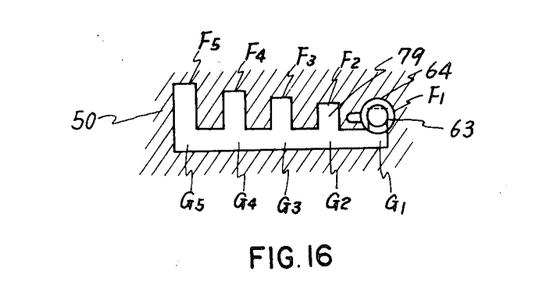
FIG. 16 is a view of the part shown in FIG. 13 as viewed in the direction XVI.

As will be seen from FIG. 14, the bottom of the gear box 50 has an arcuate form centered at the axis of the shaft 14 and is provided with a hole 79 which opens in a manner as shown in FIG. 16. The handle 63 projects outwardly through the hole 79 so that the clutch gear 51 is slid along the shaft by the movement of the handle along the hole 79, through the medium of the rocker link 61.

The handle 63 can be fixed to the gear box 54 by means of a stopper screw 64.

The anvil cylinder is rotatably supported by the frames 4, 4 through an eccentric bearing 85, so that the clearance between the anvil cylinder 1 and the die cylinder 2 can be adjusted by rotating the eccentric bearing 85 by suitable means.

The mechanism for adjusting the clearance between the anvil cylinder and the die cylinder may be constituted by other means than the eccentric bearing. For instance, it is possible to support the anvil cylinder or the die cylinder for movement in the vertical direction. It is also possible to adopt other suitable means.

The rotary die cutter of this embodiment having the described construction operates in a manner described hereinunder. As the punching and scribing operation on the sheet 9 is continued over a predetermined time, the surface of the anvil 3 is roughened as a result of the cutting by the knife 5. In such a state, the anvil cutting mechanism cuts and smooths the anvil surface to the original surface state to recover a complete cutting and uniform scribing in the same manner as described in connection with the first preferred embodiment.

As a result of the cutting of the anvil surface by the anvil cutting mechanism, the clearance between the peripheral surface of the anvil 3 and the die cylinder 1 is increased. This, however, can be corrected by adjustment by means of the eccentric bearing 85.

Since the outside diameter of the anvil 3 is reduced as a result of the cutting, the peripheral speed of the anvil 3 is reduced even when the angular velocity of the anvil cylinder is unchanged. Thus, the moving speed of the sheet 9 is changed after the cutting by the cutter blade 34, because of the change of relative peripheral speed between the anvil 3 and the knife 5. In consequence, an error is caused in the cutting size of the sheet 9. This change of relative speed, however, can be compensated for by the gear type speed changing mechanism 16 which changes the peripheral speed of the anvil cylinder 1.

Figure 17:
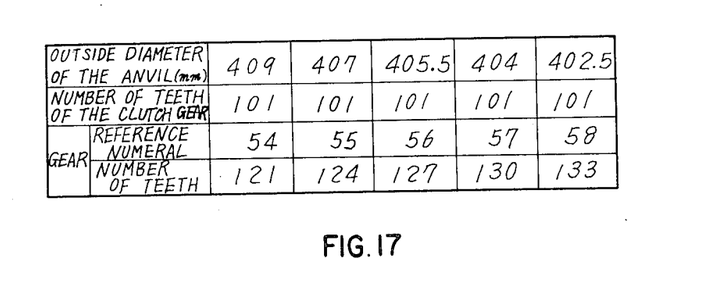
FIG. 17 is a table showing the relationship between the outside diameter of the anvil and the speed changing gears.

A detailed description will be made hereinunder as to the operation of the gear type speed changing device 16. In the illustrated embodiment, the initial outside diameter of the anvil is 409 mm, while the number of teeth of the clutch gear 51 is 101. Also, the numbers of teeth of gears 54, 55, 56, 57 and 58 are, respectively, 121, 124, 127, 130 and 133. Assuming here that the outside diameter of the anvil is 409 mm when the clutch gear 51 is engaged by the gear 54, the same relationship of peripheral speeds between the anvil 3 and the knife 5 is maintained when the outside diameter of the anvil is reduced down to 407 mm, 405.5 mm, 404 mm and 402.5 mm, respectively, if the clutch gear 51 is engaged by the gears 55, 56, 57 and 58, respectively. This relationship shown in FIG. 17 is determined by the characteristics of the differential speed reducer 20. Therefore, when the outside diameter of the anvil is reduced down to 407 mm, the gear 54 is disengaged from the clutch gear 51 and the gear 55 is brought into engagement with the clutch gear 51. This can be achieved by shifting the handle 63 located at the position $F_1$ shown in FIG. 16 to a position $F_2$. More specifically, as the stopper screw 64 is loosened, the handle 63 and the rocker link 61 are allowed to move. Then, as the handle is moved to a position $G_1$, the rocker link 61 rocks around the shaft 14 to bring to gear 54 out of engagement with the intermediate gear 62, so that the clutch gear 51 is allowed to move along the shaft 14. Subsequently, as the handle 63 is moved from the position $G_1$ to a position $G_2$, the clutch gear 51, rocker link 61 and the intermediate gear 62 are moved in the axial direction of the shaft 14 and, as the handle 63 is moved from the position $G_2$ to the position $F_2$, the intermediate gear 62 is brought into engagement with the gear 55. The stopper screw 64 is loosened in this state and then tightened to fix the handle 63, rocker link 61, clutch gear 51 and the intermediate gear 62. The changing of gear meshing to the other gears 56, 57, 58 can be made in the same manner as above.

As has been described, according to the invention, the roughness on the anvil surface generated during the cutting and scribing operation can be removed to maintain a constant state of the anvil surface without necessitating the demounting of the anvil from the rotary die cutter, by making a direct use of the driving power of the rotary die cutter, so that the faults such as incomplete cutting, penetration of the scribed line, insufficient depth of the scribed line and so forth are avoided. At the same time, since the series of works such as demounting of the anvil, transportation, cutting, reassembling and adjustment are completely eliminated, the period of suspension of the cutting and scribing operation is shortened to remarkably improve the yield. Further, the ratio of peripheral speeds between the die cylinder and the anvil cylinder is kept unchanged even after the cutting of the anvil, by a simple manual operation of the staged gear type speed changing mechanism attached to the rotary die cutter and, accordingly, the fluctuation of cutting size is avoided advantageously.

Since many changes and modifications could be made in the above-described constructions without departing from the spirit of the present invention, it is intended that all matter described in the specification and illustrated in the accompanying drawings shall be interpreted as illustrative and not in a limiting sense. It is intended therefore to cover, by the appended claims, all modifications coming within the spirit and scope of this invention.

What is claimed is:

1. Rotary die cutter for effecting a punching and scribing on a sheet which is fed between a die cylinder and an anvil cylinder disposed in parallel with said die cylinder, said die cylinder being adapted to be rotated in a predetermined direction and provided on its outer peripheral surface with a knife and a scribing rule, said anvil cylinder being adapted to be rotated in the opposite direction to said die cylinder and provided on its peripheral surface with an anvil adapted to receive said knife and said scribing rule, characterized by comprising: an adjusting mechanism for adjusting the clearance between said die cylinder and said anvil cylinder, a blade carrier disposed adjacent to said anvil cylinder and slidable in the axial direction of said anvil cylinder; a cutting blade capable of cutting said anvil and attached to said blade carrier in such a manner as to move toward and away from the axis of said anvil cylinder; and a staged gear type speed changing mechanism interposed between the driving mechanisms for said die cylinder and said anvil cylinder, said speed changing mechanism being capable of changing the angular velocity of said anvil cylinder with respect to the angular velocity of said die cylinder over a plurality of stages of speed at a fine pitch.

2. Rotary die cutter recited in claim 1 and further including:
   (a) a guide rail of T-shaped cross-section, said T-shaped cross-section including a top portion and a flat portion;
   (b) a feed member mounted on said top portion for movement therealong in the axial direction of said anvil cylinder, said blade carrier being mounted on said feed member;
   (c) a drive motor mounted on said flat portion of said T-shaped guide rail; and
   (d) means connecting said drive motor to said feed member for moving said feed member and said cutting blade parallel to the axis of said anvil cylinder for cutting the surface of said anvil cylinder.

3. Rotary die cutter recited in claim 2 wherein said means connecting said drive motor to said feed member includes a screw driven by said motor and extending parallel to the axis of said anvil cylinder, and said feed member includes a screw threaded opening engaged by said screw to move said feed member and said cutting blade parallel to the axis of said anvil cylinder.

4. Rotary die cutter recited in claim 2 wherein said feed member includes a chuck for supporting said cutting blade, and means on said feed member for moving said chuck toward and away from the axis of said anvil cylinder to adjust the position of said cutting blade.

* * * * *